Feb. 8, 1927.   1,617,088
G. TAUSCHEK
TABULATOR, PARTICULARLY FOR CALCULATING WAGES
Filed July 28, 1925   3 Sheets-Sheet 1
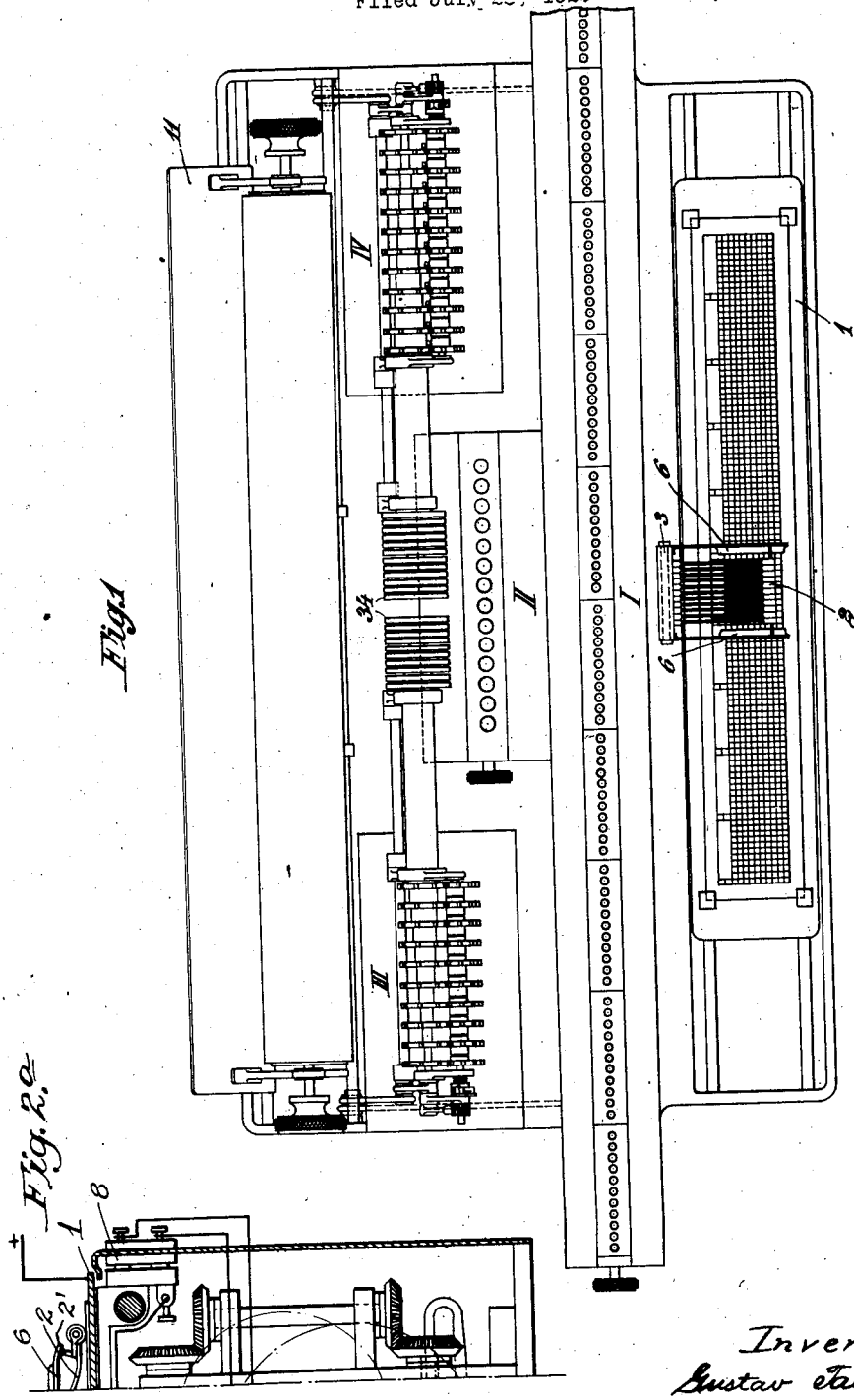

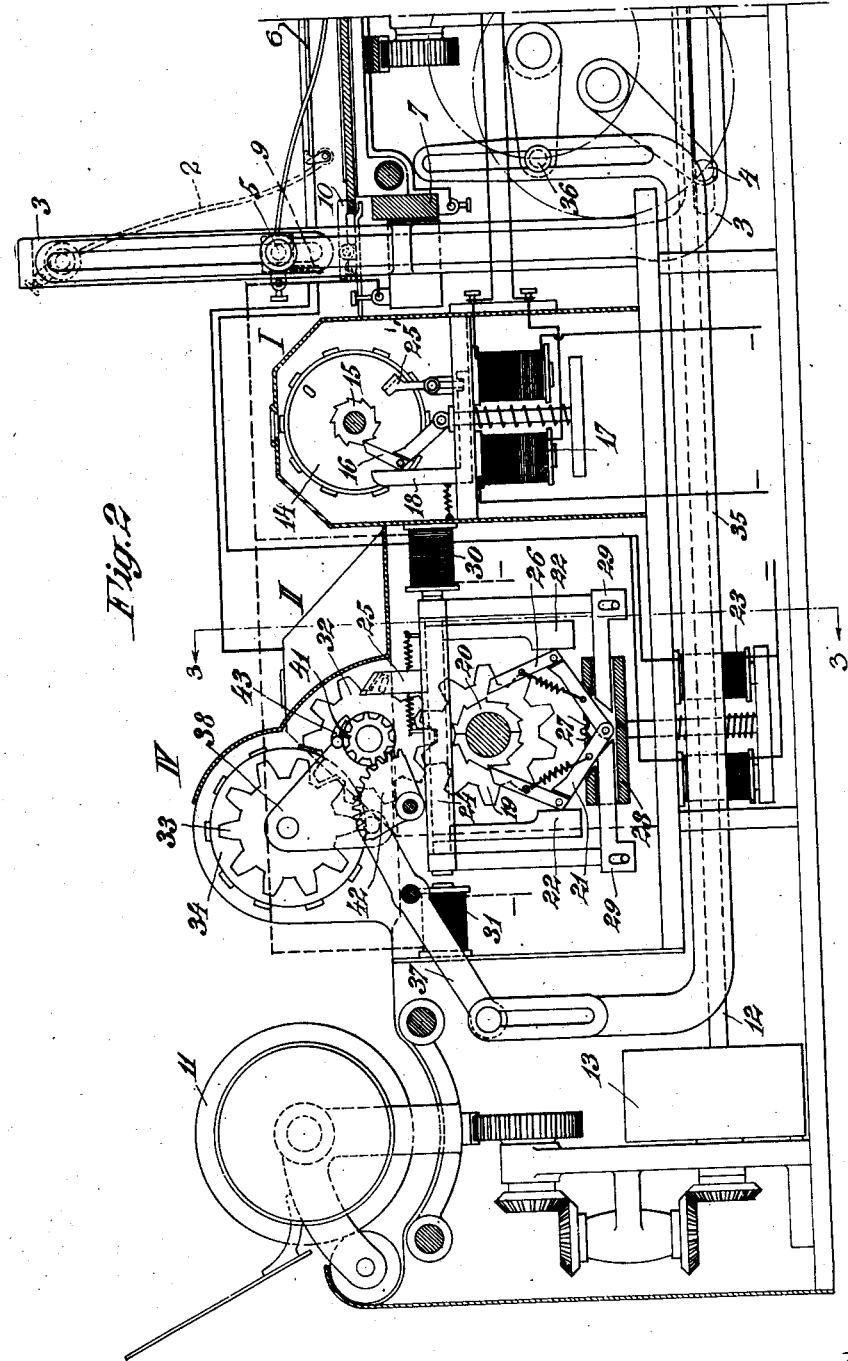

Feb. 8, 1927.
G. TAUSCHEK
1,617,088
TABULATOR, PARTICULARLY FOR CALCULATING WAGES
Filed July 28, 1925   3 Sheets-Sheet 3
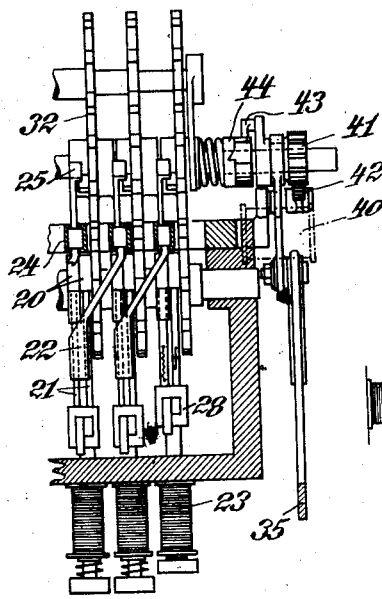
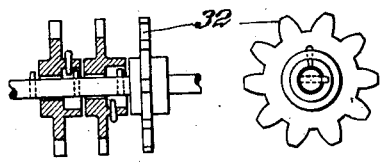
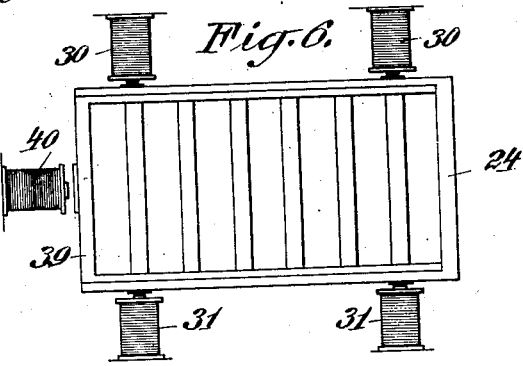
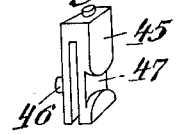
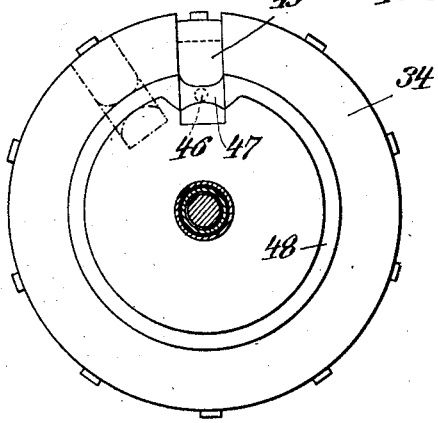
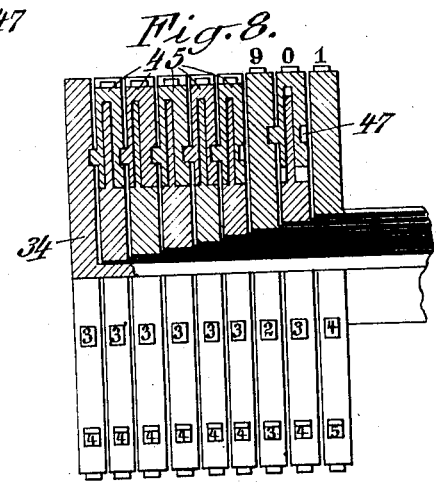
Inventor:
Gustav Tauschek
by Locke, Kohlenbeck & Farley
Attorneys.

Patented Feb. 8, 1927.

1,617,088

UNITED STATES PATENT OFFICE.

GUSTAV TAUSCHEK, OF VIENNA, AUSTRIA.

TABULATOR, PARTICULARLY FOR CALCULATING WAGES.

Application filed July 28, 1925, Serial No. 46,685, and in Austria May 6, 1924.

This invention relates to improvements in tabulators, particularly for calculating wages. A machine of this kind has to perform the following operations:—

The workman receives a certain weekly wage, extra wages, overtime wages and so forth, and from the sum of the wages are deducted contributions for rates and taxes, insurance and the like, so that finally a certain sum remains, which is actually paid out to the workman. All these individual amounts and sums have to be visible in the machine and in addition to the weekly wage the amount actually to be paid out should also appear on the pay-sheet of the workman. Finally the total sum of these part-sums is to be formed, so that the total sum to be paid out and all the part-sums of which the same is composed, will be visible at a glance.

The present invention has for its object to produce, by a suitable combination of counting mechanisms, addition and subtraction devices and preferably automatically acting type-printing devices, a machine, the parts of which are operated electrically by perforated cards representing the different individual amounts.

One mode of carrying out the present invention is illustrated by way of example on the accompanying sheets of drawings in which:—

Figs. 1 and 2 show in plan view and sectional side elevation respectively a machine constructed according to the invention, Fig. 2ª is an elevation of the extreme right end portion of the machine as shown in Fig. 2, and is to be read in connection with Fig. 2.

Fig. 3 is a detail front elevation of elements associated with a printing mechanism, with parts in section on the line 3—3 of Fig. 2; Fig. 4 is a detail front elevation of a shaft carrying a number of transmission wheels forming part of the printing mechanism, two of said wheels being shown in section; Fig. 5 is an end view of the parts shown in Fig. 4; Fig. 6 is a detail plan view of certain frames and electromagnets cooperating with the printing mechanism; Fig. 7 is an end elevation of one of the type-wheels, illustrating a nought-type shiftable in and out to take an inactive or active position; Fig. 8 is partly a longitudinal section and partly a front elevation of a plurality of type wheels of this construction; and Fig. 9 is a perspective detail view of one of the slides carrying the nought-type.

As already stated, the machine is operated electrically. The necessary closing of circuits is effected by perforated cards, on which are represented by suitable holes or perforations the individual sums of which the wage of the respective workman is composed. In the illustrated embodiment these perforated cards are divided into ten columns, each of which is sub-divided into ten sub-columns. Each of the latter corresponds to a certain denomination. Therefore if a workman has for instance a wage of 956 cents the sub-column corresponding to the hundreds will have nine holes, the sub-column corresponding to the tens, five holes and the units sub-column, six holes.

The next column contains for instance the extra wages which are likewise represented by holes, the next column may represent the rates and taxes to be deducted, and so forth. In front of each column is provided a space containing holes which indicate whether an addition or subtraction is to be performed, for instance a single hole in said space may be used to indicate addition and two holes to indicate subtraction.

The wage-card prepared in this manner for each workman is secured to a feed-slide 1 over which are reciprocated feelers 2 corresponding in number to the sub-columns of the columns as well as to the columns containing the holes which indicate addition or subtraction.

The slide 1 and also the feelers 2 are included in an electric circuit.

The slide 1 is movable in the manner of the carriage of a typewriting machine and is fed automatically for the width of one column at the required moment, so that the feelers are disposed always in line with the sub-columns of a column.

In the illustrated embodiment the movement of the feeler transversely to the perforated card is effected by a member 3 (Fig. 2), having a slot into which projects the crank-pin 4 of a suitable driving mechanism. Thus the slotted member 3, sliding in suitable guides, is continuously moved up and down. A rock shaft 5 is journaled in the upwardly extending arm of the slotted member 3, and the ends of the feelers 2 are secured to the said shaft.

The shaft 5 is under the influence of a torsional spring, which has the tendency to continuously force the free ends of the feelers against the card. The feelers are preferably provided with contact-rollers. A pair of guide rails 6 are disposed above the feed-slide 1 and cooperate with the feelers 2 in such a manner, that they pass beneath the rails 6 in one direction of movement (from the left to the right in Fig. 2), while during the movement in the opposite direction the feelers are lifted off the card. This is accomplished by providing a transverse bar 2′ which is secured to all of the feelers and projects laterally into engagement with rails 6. The outer ends of the rails are downturned, so that the bar 2′ must raise the rails slightly to pass underneath them in its outward movement. When the feelers are retracted, however, the bar will ride on top of the rails, thereby raising the feelers to inoperative position until the bar reaches the position shown in dotted lines in Fig. 2 when it will drop below the rails 6.

When the feelers slide over the perforated card, the circuit is closed as soon as the feeler registers with a hole in the card, whereby a counting mechanism I for the individual sums, disposed behind the feed slide, and the counting mechanism II for the final sum are operated.

The counting mechanism I is furnished with the same number of individual counting devices as there are columns in the card. Each individual counting device is provided with a number of denominational members corresponding to the sub-columns of the columns.

During the movement of the slide 1 the corresponding circuit is closed by means of contact-rails 7 and 8, and therefore the individual counting devices are successively connected into the circuit of the slide 1.

In the same way as the tabulator of a typewriting machine, the feed-slide 1 jumps forward for the width of the column, this movement being effected at every end-position of the feelers by having a stop 9 engage the end of a locking lever 10 and rock the same against the action of a spring to thus release the slide.

In the present case the slide 1 is positively coupled by a suitable gear with the paper-carriage 11 supporting the wage-sheet, on which finally the individual sums or the calculated end-sums are printed, in such a manner that the carriage will perform exactly the same movements as the slide.

In the present case the shaft 12 of the transmission gear is under the action of a spring, which is enclosed in a casing 13 (Fig. 2).

The slide 1 and thus also the carriage 11 are fed forward by the action of this spring as soon as the locking lever 10 is disengaged, the latter immediately again securing the former two as soon as the shift through the width of one column has taken place.

Assume that the first column of the perforated card, in which for instance the weekly wage of the workman is marked by corresponding holes, is disposed underneath the feelers 2 which pass over the perforated card owing to the operation of the machine. In this case the first individual counting device of the counting mechanism is electrically coupled with the slide 1.

The corresponding number wheel 14 is fed forward one step as often as contact is established by means of one of the feelers entering a hole. In order to attain this object, each number wheel is provided with a ratchet wheel 15, which is engaged by a pawl 16 operated by an electromagnet 17. This pawl consists of a crank-lever, the link of which rests on a guide-rail 18, arranged on a slide-member provided in the supporting frame.

On energizing the electromagnet 17 by means of current supplied thereto, the same attracts its armature against the action of a spring and feeds forward the pawl 16 to such an extent, that the ratchet wheel 15 is fed forward for the distance of one tooth.

Therefore in the observation window of the first individual counting device of the counting mechanism I is visible a figure corresponding to the number of times that the circuit has been closed by the feeler 2 registering with the first column.

Simultaneously with the electric circuit, influencing this counting mechanism, the slide 1 has also closed further circuits, one of the latter operating the counting mechanism II, another circuit operating a type-adjusting device for the individual sums and a third circuit actuating a type-adjustment device for the final or end sum. Therefore the figure present in the first column appears not only in the observation holes of the counting mechanism I, but also in the observation holes of the counting mechanism and upon the types of the type-printing devices III and IV.

Each of these type printing devices consists of a number of figure-wheels, whose rotation is transmitted to type-rollers. The feed of the figure-wheels is also accomplished by electromagnets, which are operated at every making of a contact and feed forward the figure-wheels 19 for one tooth in the same manner as has been described with respect to the counting mechanism I. The type-printing device III solely constitutes a means for the registration of the figure in the respective column of the perforated card. Therefore in this arrangement a ten-transmission or carrying mechanism is not taken into consideration.

It is quite immaterial whether this figure is to be added or subtracted for forming the final sum, as in the present case always only the registration of a number is dealt with. Therefore it is not necessary to provide an arrangement, which operates the figure-rollers in the one direction and also in the other direction. However different conditions are necessary for the type-printing arrangement IV. In this case the end sum is registered and ultimately printed or typed. Thus the figure-wheels operating the type-wheels of this arrangement have to be provided with a tens-feed or carrying mechanism, as well as to be operated in the one direction or the other, this depending on whether an addition or subtraction is desired.

The section of Fig. 2 is taken through the type-printing arrangement IV and therefore shows the more complicated mechanism. The figure-wheels 19 are fed by a ratchet wheel 20 which is engaged by a feed-pawl 21, formed by a crank-lever. This pawl rests against a guide-member or abutment 22, which prevents a bending of the same during the up-and-down motion of the pawl, so that the ratchet wheel 20 is fed forward one tooth.

The feed is carried out in the same manner, as has been described with respect to the counting mechanism I. On making the contact an electromagnet 23 is supplied with current, whereby the pawl 21 is raised and the feed is effected. In the case of a tens-feed or carrying, the pawl is operated independently of the magnet-operation in the following manner:—

The abutment 22 is mounted on a member, which is slidably arranged in a supporting frame 24 and carries a stop 25, the latter being operated by an extension of the figure-wheel of the next lower denomination or of an intermediate wheel operated by the same when passing from 9 to 0 and thus shifts the slide-member together with the abutment 22. Thereby the crank-lever is stretched (opening the toggle) to such an extent, that the ratchet wheel 20 is fed forward one tooth.

The counting mechanism I is constructed in a similar manner. The stop 25' is formed by a pivotally mounted lever, which engages the slide-member connected with the guide 18 and in the proper moment shifts the guide.

As already stated, the counting mechanism II, as well as the type-printing arrangement IV have to add and subtract. In order to attain this object I have provided a feed-pawl 26 acting oppositely to the pawl 21 and engaging a ratchet wheel furnished with teeth, extending in the opposite direction to those of the wheel 20. This pawl, which is likewise formed by a crank-lever, is disposed opposite the pawl 21 and under the action of a spring 27, which has the tendency to force the two pawls apart. The fulcrum of both pawls is arranged in a sleeve 28, which is rigidly connected with the armature of the electromagnet 23.

Extensions 29 pass into the sleeve 28 and are connected with the supporting frame 24. The inner end of each extension is tapered and forms an abutment for the respective pawl (21 or 26). The frame 24 is slidably arranged in the casing, so that the one or the other pawl is supported by one of the extensions 29 and thus is maintained in engagement with the corresponding ratchet wheel, this depending on whether the frame is in the one or the other end-position.

The shifting and securing of the frame 24 in the one or the other end-position is accomplished by electromagnets 30 and 31, which are switched into circuit by the feeler controlling the addition or subtraction.

Thus according to the position of the frame the pawls 21 or 26, operated by the electromagnet 23, actuate the corresponding ratchet wheel and therefore the figure-wheel 19 is rotated in one direction or the other, this depending on whether an addition or subtraction is to be carried out.

The rotation of the figure-wheels 19 is transmitted by intermediate wheels 32, 33 to type-printing wheels 34.

The individual figure-wheels and thus also the intermediate wheels are arranged a certain distance apart. Therefore if the intermediate wheels 34 were to form the type-rollers or be directly connected with the same, the individual figures would be spaced apart for a comparatively great distance when typing the same on the paper, as this would render more difficult the reading of the number.

According to the present invention this drawback is avoided by mounting the transmission wheels on nested tubular members, on the other ends of which are arranged the type-wheels (Fig. 8). Owing to this arrangement it is possible to arrange the transmission wheels the necessary distance apart, while the type-wheels are arranged closely to each other.

The printing of the number, set on the type-wheels, is accomplished by the latter striking against the paper-carriage 11, in front of which is arranged a ribbon such as used for typewriting machines.

The printing of the set or calculated number is effected automatically.

In order to obtain this object a slidably arranged rail 35 is provided with slotted ends, which are bent up at a right angle.

This arrangement is operated by the driving crank pin 4, which at the proper moment, thus after having touched up each column or after the whole perforated card has been passed over, is electrically coupled with a driving crank 36, engaging the slot at one end of the rail 35, whereby the latter is moved backward.

The slotted forward end of the rail 35 is coupled with a double-armed lever 37, whose other end is pivoted to a frame 38, carrying the transmission wheels 32 and 33, as well as the type-wheels 34.

In consequence of the rotation of the lever 37, effected by the shifting of the rail 35, the frame 38 is turned to such an extent, that the type-wheels strike on the paper-roller 11 and type on the paper the number to which the typewheels 34 have been set.

After having touched up each column, only the type-printing mechanism III is operated, while after having passed over the entire perforated card the type-printing mechanism IV is actuated, which indicates the total sum.

In order to render possible a swinging of the frame 38, carrying the intermediate wheels 32, 33 and the type-wheels 34, even if the stop of the intermediate wheel 32, which effects the tens-feed or "carrying," is within the path of the stop 25, the stops have to be spaced apart such a distance, that they can pass each other without obstructing each other. For this object a frame 39 is mounted longitudinally in the supporting frame 24, and the stops 25 are secured to the frame 39. The latter is under the influence of an electromagnet 40 which, immediately before the rocking of the type-lifting arrangement, is supplied with current and shifts the frame 39 to such an extent, that the stops 25 are brought out of the path of the stops, provided on the intermediate wheels 32 (Fig. 6).

The type-rollers, as well as the wheels actuating the same have to be returned again into the initial (zero) position after each typing. A toothed wheel 41 is freely rotatable on the shaft of the transmission wheels 32 and is connected with a ratchet wheel, which is coupled with the shaft only when rotating the toothed wheel 41 in the one direction. A toothed segment 42, fixed in the frame of the machine, co-operates with the toothed wheel 41. On swinging the frame 38 outward for impressing the adjusted types, the toothed wheel 41 rolls freely upon the segment. On swinging the frame 38 back into the initial position, the toothed wheel 41 is coupled with the shaft and rotated in the opposite direction, whereby also the intermediate wheels 32 are rotated and thus the type-wheels 34 are again returned into the initial (zero) position.

This detail is illustrated in front view in Fig. 3. The pawl 43, engaging the ratchet wheel, is mounted on the one member of a single acting clutch 44, which is adapted to become coupled with the shaft of the typewheels, which are disposed at different positions to one another and thus effect the initial (zero) position. This figure also shows the effect of the tens-feed or "carrying" on the next higher denomination.

Figs. 4 and 5 illustrate the mode of coupling the adjacent intermediate wheels 32, so that on returning the same into the initial position each wheel is actually taken along only, until it takes up the position corresponding to the initial position of the type-wheels.

As illustrated in Fig. 1 of the drawings, ten or twelve type-wheels are arranged side by side. Now if for instance these wheels are set for the number 901, seven or nine noughts of the higher denominations would be printed to the left of the figure 9. This of course renders difficult the reading of the number. According to the present invention a slide, carrying the "0," is radially slidable in each type-wheel and is positively operated in such a manner, that the "0" type projects beyond the periphery of the type-wheel only in case it is required for the formation of the number. The control of the nought-slide is accomplished by the type-wheel of the next higher denomination.

Figs. 7, 8 and 9 show this arrangement. The saddle-shaped slide 45 is provided with an extension or pin 46 at one side and with a wedge-shaped groove 47 at the other side. Each type-wheel 24 is furnished with an annular groove 48, which is provided with an interruption at the place corresponding to the nought-type. The slide 45 inserted at this place completes this annular groove 48 with the aid of its groove 47. If the slide 45 is pulled inward, the groove 47 forms a reentering portion relatively to the groove 48, while in the outer position of the slide 45 (shown in dash-dotted lines in Fig. 7) the annular groove is completed, the pin 46 then being at the same distance from the axis as the median line of the groove 48.

The pin 46 of the slide 45 always engages the annular groove (at the portion 48 or 47) of the type-wheel of the next higher denomination. Normally all slides are in the retracted position, e. g. the "0" type does not project beyond the periphery of the type-wheels. The type-wheel corresponding to the highest denomination is not provided with a slide. Thus the annular groove 48 of this type-wheel is invariable and is furnished with a reentering portion at the place corresponding to the nought-type.

The machine operates as follows:—

Fig. 8 shows nine adjoining type-wheels 34. In the type-wheel, corresponding to the highest denomination, the figure "0" is not necessary and therefore is omitted.

In the normal position the "0" types of all lower denominations are withdrawn below the periphery of the type-wheel, because the pins 46 of all the slides 45 are positioned in the reentering portion of the groove of the type-wheel of the next higher denomination.

As the groove in the type-wheel of the highest denomination is invariable, all succeeding "0" slides are arrested in such a position, that the "0" type does not project beyond the periphery of the type wheel.

If for instance in the construction shown in Fig. 8 the seventh type-wheel from the left is rotated (in the present case to "9"), the "0" slide of the eighth type-wheel is shifted forward, as its pin 46 has entered the portion 48 of the annular groove. The "0" slide of the ninth type-wheel is also shifted outwardly because the annular groove of the preceding eighth type-wheel now has no reentering portion, since the outward shifting of the slide has brought the groove 47 into central alignment with the groove portion 48. When the type wheels return again into the initial position, all forwardly shifted slides are again shifted back by the rigid groove of the type wheel of the highest denomination, as all slides are in engagement with one another.

The present arrangement renders it possible, that the "0" types are printed only in case they are required for forming the number, while the noughts of the higher denominations are retracted, as they have no function or significance in this special case.

As already mentioned, after the feelers have co-operated with the first column of the perforated card, the first individual counting device of the counting mechanism I, the counting mechanism II and both type-printing arrangements III and IV show the corresponding number, which has been printed on the wage-sheet by the type-printing arrangement III.

Now the perforated card is fed forward for one column, whereby also the paper-carriage is shifted a corresponding extent. Now the feelers are caused to register with the card perforations of the second field or column. In the second individual counting device of the counting mechanism I, corresponding to this column, now appears the number of the second column. The same takes place in the third type-printing arrangement. A sum or difference is formed in the counting mechanism II, this depending on whether the amount of the second column is to be added or subtracted. The same result is shown by the type-printing arrangement IV.

This procedure is continued, until the last column of the perforated card has been caused to operate the counting mechanisms and printing devices in the manner set forth.

Now the final sum obtained is typed by the type-printing arrangement IV, so that on the wage-sheet besides the name of the workman all individual sums and finally the sum actually to be paid out are shown in type. Now the second wage-card is placed into the machine and the paper-roll is fed for the name of the next workman.

The number indicated in the first column of the second card is added in the first individual counting device of the counting mechanism I to the sum already shown in the same. In the counting mechanism II addition takes place to the whole sum already shown therein. In the type-printing arrangement III appears the number of the column I of the perforated card and also in the type-printing arrangement IV.

The number of the second column of the perforated card is added to the amount in the second individual counting device of the counting mechanism I. In the counting mechanism II addition to or subtraction from, the last sum will take place as required.

The number of the column II appears in the type-printing arrangement III. In the type-printing arrangement IV is formed the sum or difference of the first column and the second column of the perforated card and so forth, until this type-printing arrangement makes another impression.

Thus the individual counting devices of the counting mechanism I always show the sums of the first, second, third and so forth columns of all cards, the counting mechanism II shows the total sum to be paid out, that is the sum of the individual amounts, which are to be paid out and which are also formed and successively typed by the type-printing arrangement IV.

Therefore in the case of a transfer or carrying over, the final sums can be read off and marked on the corresponding side of the wage-sheet, this can be carried out also after the settlement of the wage-sheet.

I claim:

1. A tabulator operated in conjunction with cards provided with perforations arranged in columns, said tabulator including a conducting body and a feeler adapted to make contact with said body whenever such feeler enters a perforation of the card, a circuit including said feeler and said conducting body and adapted to be closed whenever such contact is established, an electromagnet likewise included in said circuit, number wheels, and step-by-step feed mechanism operated by said electromagnet and associated with said number wheels to feed them one step at every closing of said circuit, whereby such number wheels will be fed as many steps as there are perforations in the column with which said feeler is in registry.

2. A tabulator operated in conjunction with cards provided with perforations arranged in columns, said tabulator including a feeler adapted to enter the perforations of such cards, a circuit provided with a gap which is closed by the movement of said feeler entering a perforation of the card, an electromagnet included in said circuit, number wheels, and step-by-step feed mechanism operated by said electromagnet and associated with said number wheels to feed them one step at every closing of said circuit, whereby such number wheels will be fed as many steps as there are perforations in the column with which said feeler is in registry.

3. A tabulator comprising a support for a perforated card, a feeler mounted to reciprocate over such card in a path corresponding to a column of the card, and adapted to enter the perforations in said column, a guide associated with said feeler and constituting a switch which causes the feeler to travel in contact with the card during the movement of the feeler in one direction, while during its return movement the feeler is lifted off the card, an electric circuit including a gap which is closed whenever said feeler enters one of the perforations of the card, and step-by-step mechanism operated by the current impulses produced by the closing of said circuit.

4. A tabulator comprising a support for a perforated card, a feeler mounted to reciprocate over such card in a path corresponding to a column of the card, said feeler being spring-pressed toward the support and mounted to rock about an axis transverse to the said path and to enter the perforations in said column, a guide associated with said feeler and constituting a switch which causes the feeler to travel in contact with the card during the movement of the feeler in one direction, while during its return movement the feeler is lifted off the card, an electric circuit including a gap which is closed whenever said feeler enters one of the perforations of the card, and step-by-step mechanism operated by the current impulses produced by the closing of said circuit.

5. A tabulator comprising a support for a perforated card, a feeler mounted to reciprocate over such card in a path corresponding to a column of the card, and adapted to enter the perforations in said column, a controlling device associated with said feeler for causing it to travel in contact with the card during the movement of the feeler in one direction, while during its return movement the feeler is lifted off the card, an electric circuit including a gap which is closed whenever said feeler enters one of the perforations of the card, and step-by-step mechanism operated by the current impulses produced by the closing of said circuit.

6. A tabulator comprising a support for a perforated card, a feeler mounted to reciprocate over such card in a path corresponding to a column of the card, said feeler being spring-pressed toward the support and mounted to rock about an axis transverse to the said path and to enter the perforations in said column, a controlling device associated with said feeler for causing it to travel in contact with the card during the movement of the feeler in one direction, while during its return movement the feeler is lifted off the card, an electric circuit including a gap which is closed whenever said feeler enters one of the perforations of the card, and step-by-step mechanism operated by the current impulses produced by the closing of said circuit.

7. An apparatus according to claim 2 in which the step-by-step feed mechanism includes a ratchet wheel, a pawl adapted to engage said ratchet wheel, a link connected with said pawl pivotally and forming a toggle joint therewith, said link being operated by said electromagnet, and a guide engaging said link and pawl at their pivotal connection and preventing an outward movement of the toggle joint.

8. An apparatus according to claim 2 in which the step-by-step feed mechanism includes ratchet wheels with teeth facing in opposite directions, toggle-jointed pawl mechanism arranged on opposite sides of the ratchet wheel axis and adapted to bring about rotation in one direction or the other, for the purpose of addition or subtraction respectively, and means for preventing outward movement of the toggle joints.

9. An apparatus according to claim 2 in which the step-by-step feed mechanism includes toggle-jointed pawls and ratchet wheels co-operating therewith for rotation in one direction or the other, and connected guides for engaging said toggle-jointed pawls and preventing outward movement of the toggle joints, said guides being connected to move in unison and holding one of the toggle-jointed pawls in active position, while the other is in inactive position.

10. An apparatus according to claim 2 in which the step-by-step feed mechanism includes toggle-jointed pawls connected with each other pivotally, ratchet wheels co-operating with said pawls for rotation in one direction or the other, a sleeve carrying the pivot of said pawls and operated by said electromagnet, and a frame having projections slidable in said sleeve and adapted to engage one pawl or the other to move it to the active position, while the other pawl is in its inactive position.

11. An apparatus according to claim 2 in which the step-by-step feed mechanism includes toggle-jointed pawls, ratchet wheels co-operating with said pawls for rotation in opposite directions, a sleeve to which both of the pawls are connected pivotally, said sleeve being operated by the electromagnet, guides engaging said pawls at their toggle joints to limit their outward movement, and a frame having projections movable within said sleeve and adapted to engage said pawls to move one of them to its active position, while allowing the other to drop away from its ratchet wheel.

12. An apparatus according to claim 2 in which the step-by-step feed mechanism includes ratchet wheels, pawls for rotating said ratchet wheels in one direction or the other, a frame movable to bring one of said pawls or the other into active position, while the other pawl is rendered inactive, an additional feeler co-operating with separate perforations of the card, a circuit provided with a gap which is closed by the movement of said additional feeler entering the perforation of the card, and electrical mechanism included in said circuit for shifting said frame in one direction or the other for addition or subtraction respectively.

13. An apparatus according to claim 2 in which the step-by-step feed mechanism includes ratchet wheels and pawls co-operating therewith for rotation in one direction or the other, a movable support operated by said electromagnet and having said pawls pivoted thereto, a spring engaging both pawls and tending to separate them and means for throwing one of said pawls or the other into active position.

14. An apparatus according to claim 2 in which the step-by-step feed mechanism includes toggle-jointed pawls, ratchet wheels co-operating with said pawls for rotation in opposite directions, a member operated by said electromagnet and pivotally connected with both pawls, guides engaging said pawls at their toggle-joints to limit their outward movement, a frame movable to throw either one of said pawls to its active position, while allowing the other pawl to move to its inactive position, a slide connected with said guides and movable on said frame in opposition to the action of springs, tens-carrying mechanism for moving the said slide at each carrying operation so that one of the toggle-jointed pawls will be stretched and feed the corresponding ratchet wheel one step independently of the electromagnet action whenever a carrying operation is performed.

15. An apparatus according to claim 2 in which the step-by-step feed mechanism includes toggle-jointed pawls, ratchet wheels co-operating with said pawls for rotation in opposite directions, a member operated by the electromagnet and pivotally connected with both pawls, a frame movable to throw either one of said pawls to its active position, while allowing the other pawl to move to its inactive position, guides engaging said pawls at their toggle-joints to limit their outward movement, a spring-pressed slide movable on said frame and connected with said guides, tens-carrying mechanism, and a stop located in the path of said mechanism and connected with said guides to move them against the influence of the spring of said slide, whenever a carrying operation is performed, thereby causing one of the toggle-jointed pawls to be stretched to feed the corresponding ratchet wheel one step independently of the electromagnet action.

16. An apparatus according to claim 2 in which the step-by-step feed mechanism includes toggle-jointed pawls and ratchet wheels co-operating therewith for rotation in opposite directions, transmission wheels forming an operative connection between said ratchet wheels and the number wheels, and corresponding individually to the several denominations of the number wheels, means controlled by the electromagnet for operating the pawl effecting rotation in one direction as well as the pawl effecting rotation in the opposite direction, a stop located in the path of a projection on one of the transmission wheels, and a shifting member connected with said stop and arranged to control the position of the pawls operatively related to the ratchet wheel of the next lower denomination, to bring one or the other of said pawls to its active position while the other is inactive.

17. An apparatus according to claim 2. in which type wheels operated by the number wheels are mounted in a swinging frame, and a paper-support toward which said frame is adapted to be swung after the type wheels have been set to the number to be printed.

18. An apparatus according to claim 2 in which the step-by-step feed mechanism has separate pawls for feeding in one direction or the other, in combination with a frame which is movable to determine which of said pawls shall be active at any particular time, a slide movable on said frame, tens-carrying mechanism operatively related to said slide, to move it in unison with said frame, type-printing mechanism normally in operative relation to said step-by-step feed mechanism and movable away therefrom into printing position, and mechanism whereby said slide, as the printing mechanism is about to be moved away from the feed mechanism, is shifted relatively to said frame to clear the path of such printing mechanism.

19. An apparatus according to claim 2 in which type wheels operated by the number wheels are mounted in a movable carrier, a paper-support toward which said carrier is adapted to be moved after the type wheels have been set to the number to be printed, and unitary mechanism for operating the feeler and the said carrier successively.

20. An apparatus according to claim 5 in which type wheels set by the number wheels are mounted in a movable carrier, a paper-support toward which said carrier is adapted to be moved after the type wheels have been set to the number to be printed, said paper-support being movable, and an operative connection for moving said paper-support synchronously with the card-support.

21. An apparatus according to claim 2 in which type wheels set by the number wheels are mounted in a movable carrier, to bring said wheels from co-operative relation to the feed mechanism to the printing position, and then return them to the original position, and zero-setting means for said type wheels, said zero-setting means being operated by the return movement of said carrier.

22. An apparatus according to claim 2 in which type wheels set by the number wheels are mounted in a carrier movable to bring said wheels to the printing position from a position of co-operative relation to the feed mechanism, and then return them to the last-mentioned position, and zero-setting means for said type wheels, said zero-setting means comprising meshing parts one of which is stationary and the other mounted on the carrier and provided with instrumentalities whereby it will be active only during the return movement of the carrier.

23. An apparatus according to claim 2 in which type wheels set by the number wheels are mounted in a carrier rocking to bring said wheels to the printing position from a position of co-operative relation to the feed mechanism, and then return them to the last-mentioned position, and zero-setting means for said type wheels, said zero-setting means including a stationary toothed segment whose axis coincides with the axis about which said carrier rocks, a pinion mounted on the carrier and meshing with said segment, and a clutch for connecting said pinion with zero-setting members proper during rotation of the pinion in one direction only.

24. An apparatus according to claim 5, in which the card-support is movable and combined with locking lever operating after the fashion of a tabulating stop, and a member operated by the feeler to bring said lever to the support-releasing position.

In testimony whereof, I have signed my name to this specification.

GUSTAV TAUSCHEK.